Patented Dec. 28, 1926.

1,612,303

UNITED STATES PATENT OFFICE.

EMIL MOLZ, OF HALLE-ON-THE-SAALE, GERMANY, ASSIGNOR TO CHEMISCHE FABRIK LUDWIG MEYER, OF MAYENCE, GERMANY.

DRY AGENT FOR MILDEWED SEED.

No Drawing. Application filed March 6, 1925, Serial No. 13,636, and in Germany August 27, 1924.

For many years arsenic in solution (in the form of arsenious acid $H_3AsO_3$) has been employed for destroying the mildew of seeds. That treatment was then abandoned as useless, the result not being satisfactory. Later on copper compounds insoluble in water were applied, preferably as copper carbonate in the dry state but its effect proved valueless in Germany. Experiments made in the United States showed that copper carbonate was satisfactory, only when the wheat was very little affected by mildew. Mercury compounds in the dry state were also suggested for the same purpose, but their effect was more or less negative.

I have found, that dry corroding agents yield excellent results, if dry mixtures of copper compounds with arsenious or arsenic acid insoluble in water or mercury compounds mixed with arsenious or arsenic acid or mixtures of such substances are employed, as for instance, tricalciumarsenite, which by any suitable action, say by atmospheric action set free arsenious acid or arsenic acid.

Quite superior effects were attained by the use of mixtures of copper compounds insoluble in water with mercury compounds insoluble in water. Those mixtures present the great advantage of splitting off very slowly in the presence of moisture arsenious or arsenic acid. I may add to those mixtures mentioned above some fungicides or fillers, like kaolin, kieselguhr and the like.

The following mixtures which may be considered as examples only have given very satisfactory results:

|   |   | Gr. |
|---|---|---|
| 1. | Copper carbonate | 95 |
|   | Arsenious acid | 5 |
| 2. | Copper carbonate | 95 |
|   | Arsenic acid | 5 |
| 3. | Copper carbonate | 90 |
|   | Tricalciumarsenite | 10 |
| 4. | Mercury rhodanate | 95 |
|   | Arsenious acid | 5 |
| 5. | Mercury rhodanate | 90 |
|   | Arsenic acid | 10 |
| 6. | Mercury rhodanate | 80 |
|   | Tricalciumarsenite | 20 |
| 7. | Copper carbonate | 50 |
|   | Mercury arsenate | 50 |

With corn 200 to 300 gr. should be taken for each 100 kilos of seed, with turnips 500 to 600 gr. for each 100 kilos of seed are sufficient, as a rule.

What I claim is:—

1. A dry agent for mildewed seeds comprising a mixture of an insoluble compound of copper, and an acid of arsenic.

2. A dry agent for mildewed seeds comprising a mixture of copper carbonate, an acid of arsenic, and a kaolin.

3. A dry agent for mildewed seeds comprising a mixture of copper carbonate, and an acid of arsenic.

4. A dry agent for mildewed seeds comprising a mixture of an insoluble compound of copper, and arsenious acid.

5. A dry agent for mildewed seeds comprising a mixture of copper carbonate, and arsenious acid.

6. A dry agent for mildewed seeds comprising a mixture of copper carbonate, arsenious acid, and kaolin.

7. A dry agent for mildewed seeds comprising a mixture of an insoluble compound of copper and a compound which will split off an acid of arsenic.

8. A dry agent for mildewed seeds comprising a compound which will split off arsenious acid.

9. A dry agent for mildewed seeds comprising a mixture of copper carbonate, a compound which will split off arsenious acid, and kaolin.

In testimony whereof I affix my signature.

EMIL MOLZ.